United States Patent
Witz et al.

[11] 3,797,999
[45] Mar. 19, 1974

[54] METHOD AND APPARATUS FOR INDICATING MICRO-ORGANIC MATTER BY MEANS OF CHEMILUMINESCENCE

[75] Inventors: Samuel Witz, Los Angeles; Rudolph H. Moyer, West Covina, both of Calif.

[73] Assignee: Aerojet-General Corporation, El Monte, Calif.

[22] Filed: May 20, 1970

[21] Appl. No.: 39,061

[52] U.S. Cl............ 23/230 R, 23/230 B, 23/231, 23/253 R, 23/258, 250/361
[51] Int. Cl.. G01n 33/00, G01n 33/04, G01n 33/16
[58] Field of Search............ 250/71, 83.3 UV, 71.5, 250/43.5, 301.1, 301.2; 128/1; 356/96, 97; 23/230 B, 231; 195/103.5 R, 127

[56] References Cited
UNITED STATES PATENTS

| | | |
|---|---|---|
| 3,567,586 | 3/1971 | Soli .......................... 195/103.5 R X |
| 3,564,588 | 2/1971 | Soli .......................... 195/103.5 R X |
| 3,359,973 | 12/1967 | Hoffman ...................... 250/71 R X |
| 3,574,064 | 4/1971 | Binnings et al. ............... 195/103.5 |
| 3,497,690 | 2/1970 | Wheeless, Jr. et al. ........... 250/71 |

Primary Examiner—Archie R. Borchelt
Attorney, Agent, or Firm—Edward O. Ansell; T. Reid Anderson

[57] ABSTRACT

The presence and relative quantity of porphyrin-containing micro-organic matter such as bacteria, tissue cells and the like are indicated by drawing material from a container of the porphyrin-containing sample under test and also from a container of a reagent simultaneously into and through a reactor cell, by means of a vacuum source. The reagent is of a character, such as a mixture of luminol and hydrogen peroxide, which upon contact with the micro-organic matter produces chemiluminescence. A photomultiplier tube housed in proximity to the reactor cell senses the chemiluminescence and produces an electrical output which is suitably amplified and integrated and read on a read-out device such as a voltmeter.

13 Claims, 4 Drawing Figures

SAMUEL WITZ
RUDOLPH H. MOYER
INVENTORS

BY D. Gordon Angus
ATTORNEYS

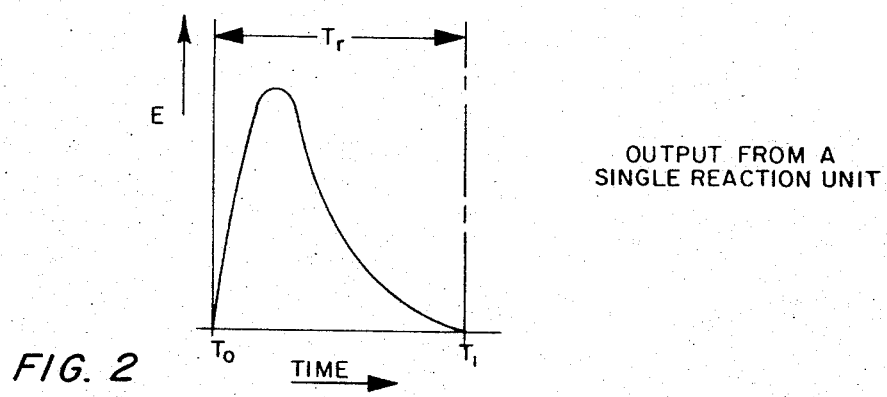
FIG. 2 — OUTPUT FROM A SINGLE REACTION UNIT
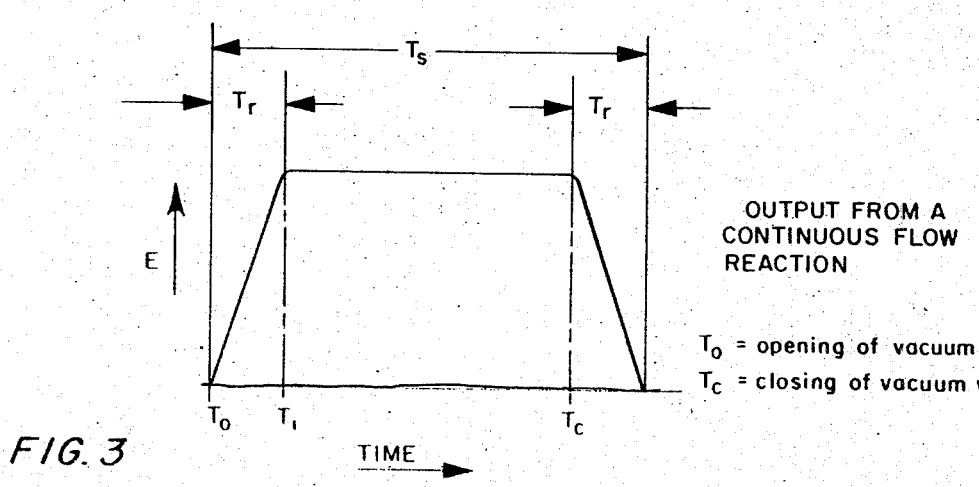
FIG. 3 — OUTPUT FROM A CONTINUOUS FLOW REACTION
$T_o$ = opening of vacuum valve
$T_c$ = closing of vacuum valve
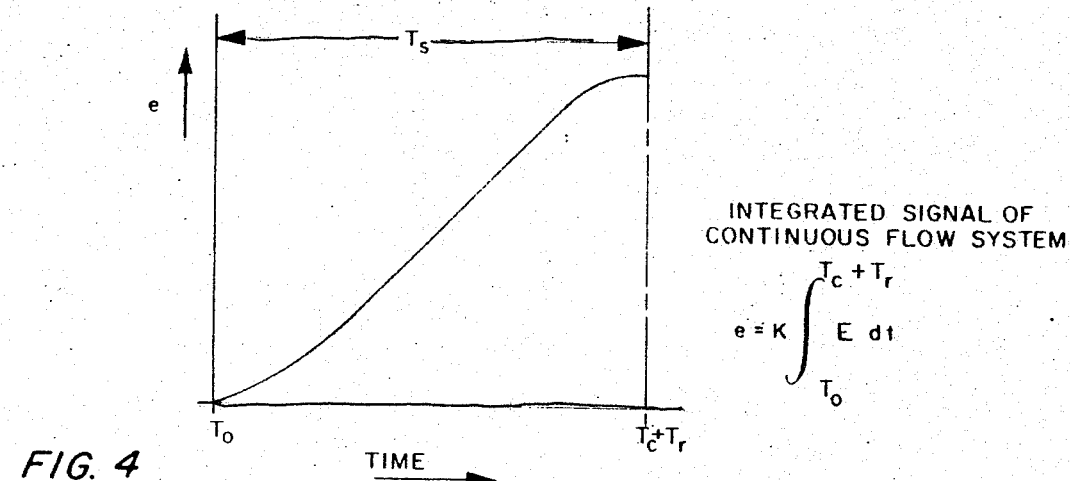
FIG. 4 — INTEGRATED SIGNAL OF CONTINUOUS FLOW SYSTEM
$$e = K \int_{T_o}^{T_c + T_r} E\, dt$$

METHOD AND APPARATUS FOR INDICATING MICRO-ORGANIC MATTER BY MEANS OF CHEMILUMINESCENCE

This invention relates to the detection of micro-organic matter which is or has been living, such as bacteria, tissue cells and the like, and more particularly to quantitative detection of specific biological organisms and the like by means of chemiluminescence.

The invention has for an object to provide a simple form of apparatus and method for obtaining an indication or reading of the relative amount of such specific matter present in a general background which can contain other more or less similar matter.

A related object is to provide for a high degree of sensitivity in the measurement of the amount of such matter.

The phenomenon of chemiluminescence has been used heretofore for the detection and quantitiative measurement of biological organisms such as are encountered in air and water pollution, biological warfare, foor purification, the efficiency of sterilization methods, and the like. The chemiluminescence technique has been practiced by the production of light by reaction of luminol and hydrogen peroxide in the presence of these micro-organisms.

Another example of the use of a bioluminescent reaction to detect matter in a sample is described in U.S. Pat. No. 3,359,973 issued Dec. 26, 1967, which describes apparatus and a method for the detection of adenosine triphosphate (ATP) which is present in all forms of living matter. But since ATP is not present in such matter which is no longer living, that reaction is not capable of detecting dead organisms. The equipment described in Pat. No. 3,359,973 involves the use of a bioluminescence reaction chamber containing a reactant comprising firefly lantern extract to which a sample to be tested is brought. In the event that the sample contains ATP, light will be produced from the resulting reaction, and a photo detection means will detect the magnitude of the bioluminescent reaction when the test sample comes into contact with the reactant.

In accordance with the present invention there is provided an apparatus and method capable of detecting and indicating relative amounts of organisms whether living or dead, and with relatively great sensitivity. By use of this invention there is provided a detecting system capable of monitoring the porphyrin content of various fluids in the bio-medical, food and water fields of interest.

The invention is carried out by producing a flow of reagent and of sample material through a reactor cell for a period of time to produce the chemiluminescence resulting from the contact of the reagent with the sample in the cell. The total light output from the reaction in the cell over this time period is monitored by a light-sensitive device exposed to the light developed in the cell. A signal resulting from the output of the light-sensitive device indicates the concentration of organisms or agent in the original sample.

According to a preferred feature, the flow through the cell is produced by a vacuum source.

According to another preferred feature, the light-sensitive device is a photo-multiplier device producing an output dependent on the light from the reactor cell.

According to another preferred feature, the output of the light-sensitive device is integrated and brought to a read-out device.

According to another preferred feature, the read-out device is set into operation for a period of time prior to the time period of the flow of the material through the reactor cell.

The apparatus and method according to this invention are capable of greater sensitivity than has heretofore been attained. The maintenance of flow through the reaction cell provides an increase of light intensity and total light from the reaction with a resulting stronger indication at the read-out. The sensitivity is further augmented by use of amplifying and integrating devices at the output of the photo-sensitive device.

The foregoing and other features of the invention will be better understood from the following detailed description and the accompanying drawing of which:

FIG. 2 illustrates graphically the light energy output from a single reaction unit, without continuous flow;

FIG. 3 illustrates graphically the light energy output from a continuous flow reaction obtained from a system according to this invention; and FIG. 4 illustrates graphically the integrator output voltage in the use of a continuous flow system according to this invention.

Figure 1:
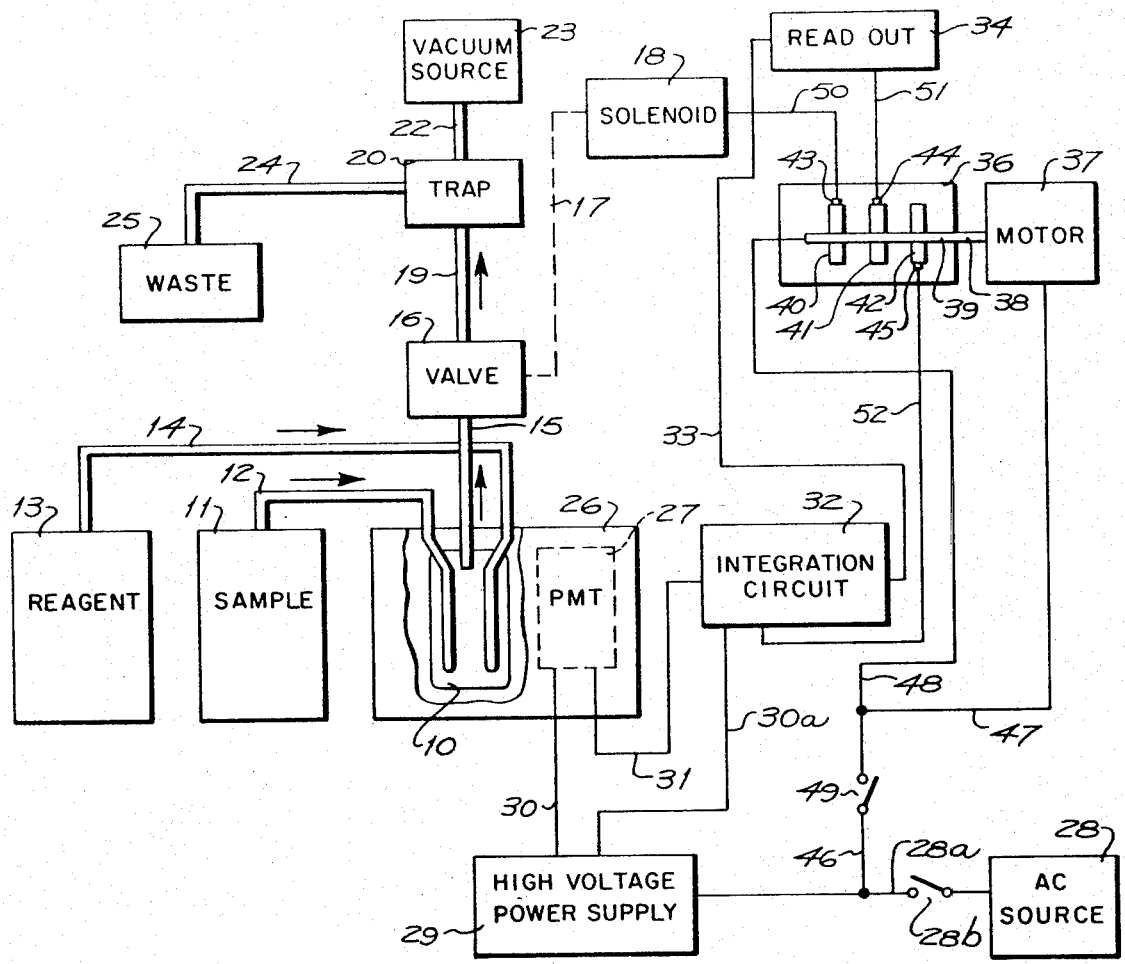
FIG. 1 shows in schematic form equipment and method of performing the invention.

FIG. 1 shows schematically a system according to the invention, in block diagram form, double lines being used to represent fluid conduits and single lines are used to represent electric lines even though in actual practice an electric line may comprise more than a single conductor. In the drawing there is shown a reactor cell 10 of a transparent material which may be of glass. Fluid containing the sample to be monitored is placed in sample container 11 from which a conduit 12 is brought into the reactor cell. The reagent to be used is placed in a reagent container 13 from which a conduit 14 is brought into the reactor cell. A conduit 15 leading from within the cell is brought to a valve 16 operable by an arm 17 from a solenoid 18. The output from the valve is carried through a conduit 19 to a trap 20 from which a conduit 22 leads to a vacuum source 23 which may for example be an oil pump or an aspirator or the like, capable of drawing fluid from the reagent and sample containers into and through the cell 10 through the valve 16 to the trap when the valve is open. Liquid in the fluid will be diverted by the trap while gaseous components will go on to the vacuum source. This fluid system is effectively sealed from the atmosphere, excepting for the reagent, sample and waste containers so that the vacuum source can draw liquid from the reagent and sample containers, and cause the flow through the reactor cell as described. There are a number of well-known ways by which the liquid waste can be removed. One way is to use a trap which can be of a common type, for example, in which the relatively heavy liquid drops to a lower region or sink portion of the trap while the lighter gas is drawn into the vacuum source. The liquid thus trapped can be released through a conduit 24 to waste 25.

The reactor cell 10 is placed within a light proof housing 26, shown partly broken away to reveal the cell, and in proximity to the cell within the housing there is located a light-sensitive and responsive device 27 which will ordinarily be in the form of a photomultiplier tube, which is a well-known device. A suitable tube for the purpose is that known as RCA1P21 photo-multiplier tube. Since no light enters the housing from outside, the photo-multiplier tube will respond only to light from the reactor cell and not to any general lighting or to light from any other source. The photo-multiplier tube is operated electrically in a well-known manner and provides an electric output dependent on the intensity of light from the reactor cell. The electric circuity is shown in simplified single line diagram form. Electric power for the system may be provided from any suitable power source 28 ordinarily about 110 to 120 volts AC, over a line 28a. A power supply arrangement 29 is operated from line 28a to produce high-voltage required by the photo-multiplier tube which is supplied to it over a line 30 from the high-voltage supply 29. The electric output of the photo-multiplier tube is carried over a line 31 to the input of an integration circuit 32 which, in addition to performing the well-known integrating function also provides amplification. A suitable integrator is that illustrated and described in Handbook of Operation Amplifier Applications First Edition by Burr Brown Research Corp., 1963. The output of the integration circuit is brought over a line 33 to a read-out device 34 which may be a voltmeter or any other suitable form of read-out such as a digital voltmeter.

Neither the valve solenoid 18 nor the integration circuit 32 nor the read-out 34 become operable coincident with the application of AC power from source 28 to the high-voltage supply source 29 when power switch 28b is closed. Instead the operation is programmed in that devices 18, 32 and 34 are operated or made operable by power supplied through a cam operated switch mechanism 36 driven and timed by a timing motor 37 whose shaft 38 is integral with or coupled to a cam shaft 39 provided with cams 40, 41 and 42 which operate respective cam switches 43, 44 and 45 according to the timing of the cams. For this purpose a line 46 from the power line 28a brings electric power to the timing motor 37 over line 47 and also to the cams over line 48 when switch 49 is closed. A line 50 from cam switch 43 carried operating power to the solenoid 18; another line 51 carries power from cam switch 44 to render the read-out 34 operable in some suitable manner, for example by operating a relay (not shown) within the read-out to complete its input circuit from line 33; and a line 52 carries power from cam switch 45 to render the integration circuit 32 operative, for example by energizing a relay (not shown) within the integration circuit system to render it operative in some well-known manner, for example by completing its input circuit from the photo-multiplier tube 27 or from its power supply.

After putting the vacuum source 23 into operation and applying power to the high-voltage power supply by switch 28b, the system can be put through a cycle of operation by closing switch 49 which will operate the starting motor to turn the cam shaft 39 at a rate determined by the timing of the motor. The solenoid, integration circuit and read-out will then be rendered operable at times and for durations of time established by the closure of cam switches 43, 44 and 45, which will depend on the positions and contours of the cams.

To enhance the sensitivity it is desired to carry on the integration and read-out operations before, during and following the fluid flow through the reactor. It has been found satisfactory, for example, to perform the integration operation for about 30 seconds, during only about 10 seconds of which liquid is caused to flow through the reactor. Generally, the read-out device will be operated throughout the integration, but for some purposes it may be found desirable that the time of operation of the read-out does not necessarily coincide with that of the integration. Considering an entire operation of about 30 seconds, the switch 49 will be closed to start the motor 37. Then at a time zero the cam switch 45 will close to render the integration circuit operable to apply signal to the read-out. About 10 seconds later the cam switch 43 will close to energize solenoid 18, causing its arm to open valve 16 which will allow the operating vacuum source 23 to draw liquid from containers 11 and 13 through the reactor cell 10 to the trap 20. Fluid will thus flow through the cell for about 10 seconds whereupon cam switch 43 will open again by action of the cam 40. Throughout this time cam switch 45 will remain closed and will stay closed for about 10 seconds after the valve 16 has been shut. If cam 41 is arranged to coincide with the operation of cam 42 the read-out 34 will be operative during the same 30 seconds. Assuming the read-out is to be operated over the same time period as the integration circuit, it may be found more convenient to eliminate the cam 41 and simply connect line 51 to cam switch 45 or else to maintain the read-out operable to all times even when the integration circuit is not operative.

It will be recognized that the forgoing time periods are given only by way of example and that other time periods than those mentioned in the above example can be selected if desired. These will usually depend on the material being sampled and the reagent being used. Based on certain design limitations practical flow periods would generally range form about 5 to 30 seconds.

This device is capable of testing for an indication of relative quantities of porphyrins, ATP and also free radicals such as OH radicals, organic free radicals or others. This will include the detection and monitoring for bacteria or tissue cells inasmuch as porphyrins are associated with these materials.

It will ordinarily be desirable to separate the organisms under test from undesired interferring substances. This can involve a filtering and washing operation prior to placing the sample in the test container. In making up a sample of bacteria for test, the bacteria are ordinarily suspended in distilled water, or alternatively in some cases, in a buffer of the water containing certain salts.

The reagent used for this detection is ordinarily luminol plus hydrogen peroxide which may be prepared and have the following composition:

Using a stock luminol solution (which will remain stable for about 1 week at ambient temperature) containing 60 grams sodium hydroxide, 15 grams ethylenediamine tetracetate and 1 gram of luminol in 2.5 liters of glass distilled water, mix in the following proportion daily:

150 ml stock luminol solution
30 ml 3 percent $H_2O_2$ solution

Mix and let sit at ambient temperature for a minimum of one/half hour before using. Mixed solution stable for at least 8 hours at ambient temperature. The ratio of luminol solution to $H_2O_2$ solution can be varied over a fairly wide range without any great change in sensitivity of the system.

The sample and the reagent begin to flow through the reactor cell upon opening, time $T_o$, of the vacuum valve.

Since photon energy production from a single reaction unit, that is, a non-flow system, does not occur instantaneously but rather requires a finite period of time $T_r$ from zero and then back to zero (FIG. 2), the total instantaneous photo energy emission from within the reactor cell where the sample and reagent are being introduced continuously (FIG. 3) will initially rise from zero until, at time $T_i$, this instantaneous energy will reach a steady state level. Similarly, the instantaneous energy will decay from the steady state level to zero in the time $T_r$ upon closing of the vacuum valve, as shown in FIG. 3.

The photo-multiplier tube senses some fraction of the total instantaneous photo energy emitted from within the reactor cell and converts this energy into a proportional instantaneous electrical output signal. After suitable electronic isolation and amplification, this signal appears as a voltage, $e_i$ (FIG. 4), at the input to an electronic integrator. This integrator is operable for the total sample period $T_s$ and the integrator output voltage at the termination of this sample period is expressed by $$e = K \int_{T_o}^{T_o+T_r} E dt$$

Where $K$ is system constant including such fixed parameters as PMT quantum efficiency, amplifier gain, PMT supply voltage, and luminous flux distribution from the reaction.
$E$ = luminescence intensity of the reaction. s
This integrated voltage value is proportional to the total accumulated photon energy emitted from within the reactor cell over the sample period $T_r$.

A novel feature of this continuous flow reaction system is that the sample volume is not restricted to an upper limit. For a non-flow system such a limit does exist and the volume of the sample well, and therefore the sample, cannot be increased without limit because of optical coupling requirements. Furthermore, a continuous flow system lends inself to a much more uniform and reproducible mixing of the sample and reagent than a non-flow system. Additionally, continuous real-time assaying of a sample is possible with the continuous flow system while not with the non-flow system.

The integrated output of a sample is ideally suited for manipulation as required to yield reaction energy per ml of sample, reaction energy per unit time, instantaneous reaction energy or other related forms of presentation.

For using the mechanism for various types of organisms, callibration charts can be made for each different type of organism to be tested showing the quantitative amount of the organism in a given quantity of water of other substance corresponding to the read-out indication. Hence by use of the chart, the quantity of the organism can be read directly on the chart from the read-out figure.

It will be recognized that this invention provides for a rapid assay of the bacterial content of various fluids in the biomedical, food and water areas, such as the bacterial content of regenerated or recycled water, wine, liquid sugar concentrates and the like. Since the invention provides a general porphyrin detector, it can also be used for detecting excessive amounts of porphyrin in urine, milk and red blood cells after suitable processing of the sample. Thus pathological conditions can be detected in humans and animals by monitoring the porphyrin level in their body fluids. The device is also useful for determining the bio-mass profile of the ocean for oceanographic survey work.

The invention is useful as a general photometer for measuring the total light output of any chemiluminescent reagent and hence can be used to assay for micro quantities of peroxides which induce chemiluminescence of the luminol reagent or phenols and antioxidants which quench luminescence in direct proportion to their concentration.

Since the luminol reagent is activated by free radicals to produce luminescence, the system is useful to monitor free radical production when luminol is used in the reagent.

By this invention there are provided a system and method which are more simple and less costly and in many instances much more sensitive, than other monitoring arrangements for monitoring bacteria, porphyrins, or free radicals.

The system and apparatus of this invention are not limited to use of luminol as a reagent but can also make use of other reagents such as fire fly extract triggered into chemiluminescence by the ATP found in living organisms.

What is claimed is:

1. A system for detecting porphyrincontaining microorganisms in a sample comprising a reaction cell, light-sensitive means arranged to receive chemiluminescence developed in the cell and to produce an output responsive to the amount of light, read-out means, means conveying a signal dependent on said output to said read-out means, means for conveying sample material into the cell, means for conveying into the cell material of a chemical reagent which when brought into contact with the porphyrin-micro-organisms produces chemiluminescence and means producing flow of said reagent material and said sample material simultaneously through the cell for a period of time.

2. A system according to claim 1 in which the light-sensitive means is a photo-multiplier device.

3. A system according to claim 1 in which the read-out means is a voltmeter or ammeter.

4. A system according to claim 1 in which the means conveying a signal dependent on the output of the light-sensitive means includes an integrator.

5. A system according to claim 1 in which a light-proof housing encloses the reaction cell and light-sensitive means.

6. A system according to claim 1 in which the means producing flow is a vacuum source connected to draw sample and reagent material into the cell and out of the cell.

7. A system according to claim 1 in which the time period is established by a valve in the flow path and timing means connected with the valve opens and later closes the valve to establish the time period.

8. A system according to claim 7 in which the timing means maintains the valve open to permit fluid flow during only part of the time that the light-sensitive means and read-out means are functioning.

9. A system according to claim 8 in which the timing means opens the valve at a time period after rendering the read-out means operative.

10. A system according to claim 7 in which the timing means comprises cam-operated switching means.

11. Method of testing a sample comprising porphyrin-containing micro-organisms or the like which comprises simultaneously producing flows of material to be tested and of reagent capable of producing chemiluminescence when brought into contact with said material, into a cell and out of the cell for a period of time and producing an indication of the amount of chemiluminescence during said time period.

12. Method according to claim 11 in which the indication is produced photoelectrically on an electric read-out.

13. Method according to claim 12 in which the read-out is rendered photoelectrically operative for a period of time before the commencement of the time period of the flows of material and reagent.

* * * * *